United States Patent
Holm et al.

(10) Patent No.: US 9,464,818 B2
(45) Date of Patent: Oct. 11, 2016

(54) METHOD AND SYSTEM FOR CONTROLLING VENTILATION IN A BUILDING

(71) Applicant: VKR HOLDING A/S, Horsholm (DK)

(72) Inventors: Jes Weinreich Holm, Horsholm (DK); Jesper Darum, Brondy (DK); Lennart Ostergaard, Horsholm (DK); Ole Bentsen Hansen, Odense NV (DK); Kaare Slyngbom Jorgensen, Brenderup (DK); Henning Gronbaek, Ferritslev (DK)

(73) Assignee: Windowmaster A/S, Vedbaek (DK)

( * ) Notice: Subject to any disclaimer, the term of this patent is extended or adjusted under 35 U.S.C. 154(b) by 0 days.

(21) Appl. No.: 14/372,476

(22) PCT Filed: Jan. 18, 2013

(86) PCT No.: PCT/DK2013/050016
§ 371 (c)(1),
(2) Date: Jul. 16, 2014

(87) PCT Pub. No.: WO2013/107461
PCT Pub. Date: Jul. 25, 2013

(65) Prior Publication Data
US 2015/0011154 A1    Jan. 8, 2015

(30) Foreign Application Priority Data
Jan. 18, 2012  (DK) ................................. 2012 70032

(51) Int. Cl.
*F24F 7/00* (2006.01)
*F24F 11/00* (2006.01)
(Continued)

(52) U.S. Cl.
CPC .............. *F24F 11/001* (2013.01); *F24F 7/007* (2013.01); *F24F 11/0001* (2013.01);
(Continued)

(58) Field of Classification Search
CPC ...................................................... F24F 11/001
USPC ................................................... 454/256, 258
See application file for complete search history.

(56) References Cited

U.S. PATENT DOCUMENTS 5,971,067 A * 10/1999 Rayburn .............. F24F 11/0017
165/217
6,098,893 A *  8/2000 Berglund ........... G05D 23/1917
236/51
(Continued)

FOREIGN PATENT DOCUMENTS

CA      2520975 A1     4/2007
EP      0710804 A2  *  5/1996  .......... F24F 11/0017
(Continued)

OTHER PUBLICATIONS

Danish Patent Application No. PA 2012 70032, Office Action mailed Sep. 3, 2012, 3 pages.
(Continued)

*Primary Examiner* — Steven B McAllister
*Assistant Examiner* — Jonathan Cotov
(74) *Attorney, Agent, or Firm* — Kilpatrick Townsend & Stockton LLP

(57) ABSTRACT

A method and a system for controlling ventilation of an indoor area of a building, comprising the steps of: ventilating the indoor area by means of mechanical ventilation and natural ventilation according to a ventilation mode selected among a plurality of ventilation modes, a set of adjustable control parameters (31; 32; 33; 34; 35) and at least one measurement value from a sensor, wherein each ventilation mode is associated with the set of adjustable control parameters (31; 32; 33; 34; 35), each having an adjustable value selected among a group of mode dependent adjustable values, and/or a set of fixed control parameters (34) each having a mode dependent fixed value, and controlling the mechanical ventilation and the natural ventilation by comparing the measurement value from the sensor with a corresponding value of the control parameters of the ventilation mode such that a desired indoor climate defined by the ventilation mode is obtained.

24 Claims, 10 Drawing Sheets

Figure 1:
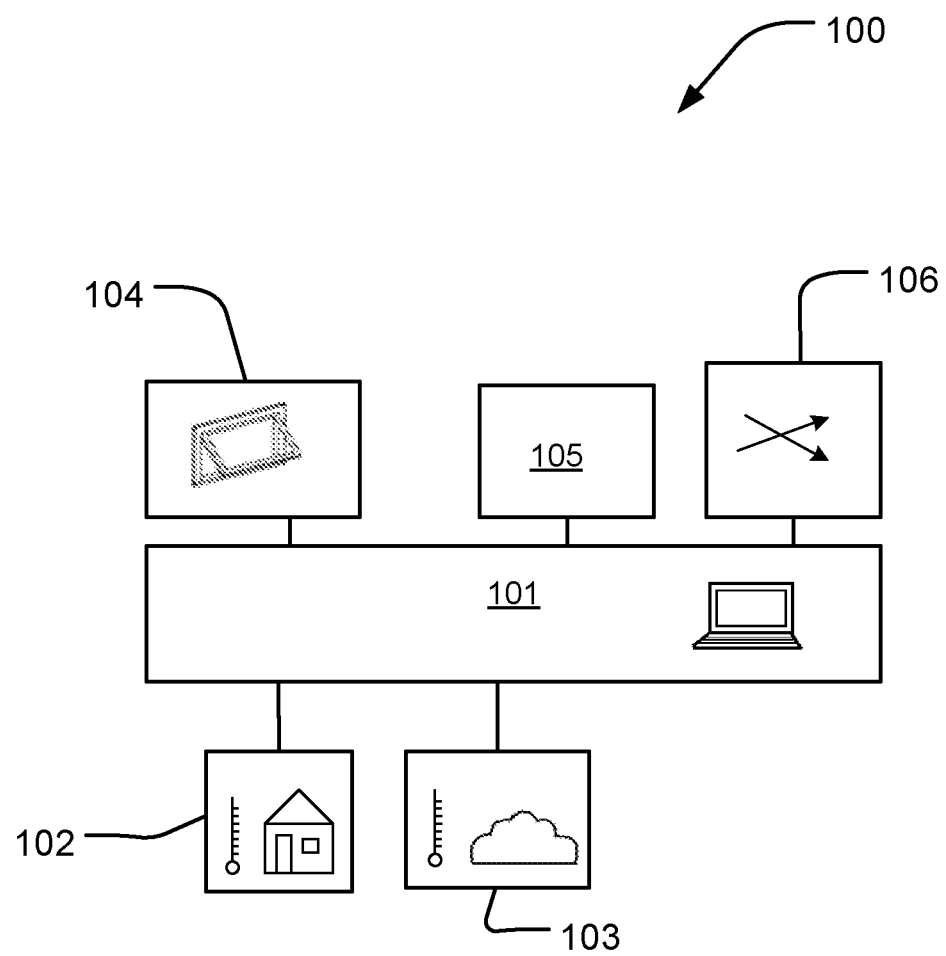

(51) Int. Cl.
*F24F 13/06* (2006.01)
*F24F 13/08* (2006.01)
*F24F 7/007* (2006.01)

(52) U.S. Cl.
CPC ....... *F24F 11/0012* (2013.01); *F24F 11/0015* (2013.01); *F24F 11/0034* (2013.01); *F24F 2007/004* (2013.01); *F24F 2011/0002* (2013.01); *F24F 2011/0006* (2013.01); *F24F 2011/0026* (2013.01); *F24F 2011/0032* (2013.01); *F24F 2011/0064* (2013.01); *Y02B 30/78* (2013.01)

(56) References Cited

U.S. PATENT DOCUMENTS

| | | | | |
|---|---|---|---|---|
| 6,161,764 | A * | 12/2000 | Jatnieks | F24F 3/044 165/249 |
| 7,187,987 | B2 * | 3/2007 | Andersen | F24F 11/0001 700/20 |
| 7,798,418 | B1 * | 9/2010 | Rudd | F24F 3/001 236/49.3 |
| 2004/0222307 | A1 * | 11/2004 | DeLuca | F24F 11/0009 236/46 R |
| 2005/0144963 | A1 * | 7/2005 | Peterson | F24F 11/0001 62/178 |
| 2006/0150644 | A1 * | 7/2006 | Wruck | F24F 11/0017 62/126 |
| 2009/0013703 | A1 * | 1/2009 | Werner | F24F 5/0046 62/180 |
| 2010/0332034 | A1 * | 12/2010 | Bergeson | E06B 7/08 700/275 |
| 2011/0238223 | A1 * | 9/2011 | Narayanamurthy | F24F 5/0046 700/277 |
| 2011/0257795 | A1 * | 10/2011 | Narayanamurthy | F24F 5/0046 700/277 |
| 2013/0171922 | A1 * | 7/2013 | Jensen | F24F 11/0001 454/239 |

FOREIGN PATENT DOCUMENTS

| | | |
|---|---|---|
| EP | 0710804 A2 * | 8/1996 |
| JP | 2002039579 A | 2/2002 |
| WO | 2007094774 A1 | 8/2007 |

OTHER PUBLICATIONS

International Patent Application No. PCT/DK2013/050016, International Search Report mailed May 6, 2013, 3 pages.
International Patent Application No. PCT/DK2013/050016, International Preliminary Report on Patentability mailed Jan. 15, 2014, 6 pages.

* cited by examiner

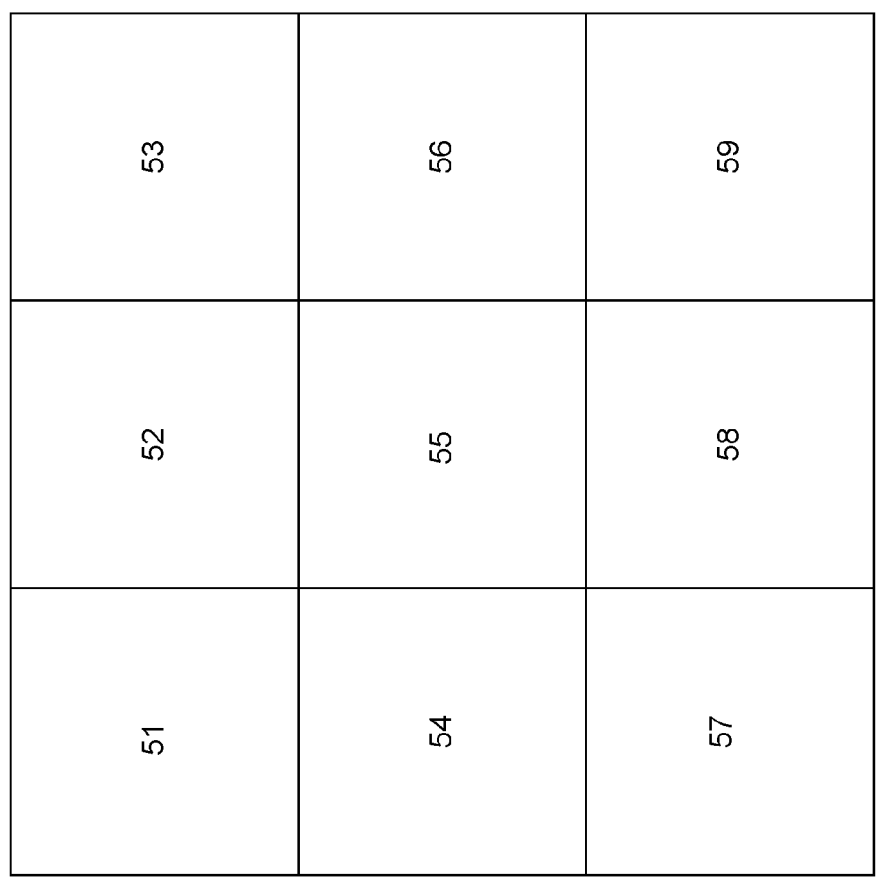

METHOD AND SYSTEM FOR CONTROLLING VENTILATION IN A BUILDING

CROSS REFERENCE TO RELATED APPLICATIONS

This application is the U.S. national phase of International Application No. PCT/DK2013/050016 filed on Jan. 18, 2013 and published in English on Jul. 25, 2013 as International Publication No. WO 2013/107461 A1, which application claims priority to Denmark Patent Application No. PA 2012 70032 filed on Jan. 18, 2012, the contents of both of which are incorporated herein by reference.

The present invention relates to a method for controlling ventilation of an indoor area of a building, comprising the steps of ventilating the indoor area by means of mechanical ventilation and natural ventilation according to a ventilation mode selected among a plurality of ventilation modes, a set of adjustable control parameters and at least one measurement value from a sensor.

As ventilation systems for buildings are developed more and more, the requirements from the users are also evolving. In addition to a comfortable indoor climate, other parameters may start to play a role.

The modern ventilation and climate control systems used today in particular in larger buildings such as schools and office buildings combine different ways of ventilating the building and often divide the building into zones such that the ventilation and/or temperature can be controlled in a smaller area, taking into consideration the specific conditions that apply in a specific area, such as air quality and temperature. For example if there are many people in an area there is a greater need for ventilating and cooling the room, while few people in an area requires less ventilation and maybe more heating of the room. Depending on the outside weather and air quality conditions the ventilation may be provided via opening of windows or through mechanical ventilation means that may condition the air before it enters the indoor area.

A heating, ventilation, and air conditioning (HVAC) system is disclosed in US 2005/0144963. A control method and system for providing controlled circulation and/or ventilation levels in a building structure is disclosed. The system includes one or more sensors for sensing one or more environmental conditions in and/or around the building structure, including temperature, humidity, air quality sensors. The system settings includes set point values, system mode (e.g. heat, cool or off), whether the building is expected to be occupied or unoccupied, time of day, time of year etc. Based on the measurement(s) of the sensors and the system settings, the HVAC system may adjust the circulation and/or ventilation time accordingly. The system may be set to an auto mode such that depending on the selected set values for e.g. temperature and humidity the ventilation/circulation is adjusted. A fresh air vent may optionally be used, providing fresh air through the ductwork by utilizing the fan at hand. The purpose is to obtain adaptive circulation/ventilation, while minimizing costs and wear on the equipment.

Another system for controlling the air quality for an indoor area divided into a plurality of zones is disclosed in EP 0 710 804. The system comprises a plurality of sensors detecting temperature, $CO_2$, volatile organic compounds and humidity, and a plurality of zone controllers. The measurement of the sensors are compared with central minimum and maximum threshold values and a central damper is modulated to vary the flow of outside air into the supply air stream based on this comparison. The purpose of this is to allow for efficiently controlling the air quality of an indoor area in a situation with low temperature and poor air quality.

These solutions, however, does have some drawbacks where the ventilation may be controlled in a more optimal way in view of the desired indoor climate according to the user and the users desires in other ways that are not physically measurable on e.g. a temperature scale.

It is therefore an object of the present invention to provide an improved method and system for controlling ventilation of an indoor area of a building, wherein both indoor climate and user requirements is actively taken into consideration.

With a view to this the method according to the present invention is characterized by each ventilation mode is associated with the set of adjustable control parameters, each having an adjustable value selected among a group of mode dependent adjustable values, and/or a set of fixed control parameters each having a mode dependent fixed value, controlling the mechanical ventilation and the natural ventilation by comparing the measurement value from the sensor with a corresponding value of the control parameters of the ventilation mode such that a desired indoor climate defined by the ventilation mode is obtained.

This allows the ventilation to be adjusted depending on the chosen mode, where the mode may contain certain limitations as to what the values of the control parameters may be and within what limits the adjustable values may be chosen from. By not merely having one "auto" mode where the user is only able to adjust the desired indoor temperature the user is able to chose a mode that enables them to consider other aspects. The aspects may be that a lower degree of variance is accepted in the indoor temperature or it may be to choose a mode where the overall energy consumption is very low or where the modes are set to a certain security state, for example where the windows are kept closed during certain periods due to the risk of burglary while still obtaining the desired indoor climate. These aspects or different modes may be combined. So when choosing the desired mode environmental or economical interests may be taken into consideration.

It has been shown that people are more satisfied with the indoor climate when they have influence on the indoor climate, and in view of the modes they are more likely to accept e.g. a lower indoor temperature or more variation in the indoor temperature when they know that other aspects such as environmental or economical interests are considered as well.

In this context the term "natural ventilation" covers ventilation provided by any means of ventilation not consuming any energy while ventilating the area. This means that there are no energy used to move the air in and/or out of the building, energy is only used to keep the controls and sensors etc. up and running. It is an exchange of air to and from an indoor space as a result of pressure differences including wind and temperature differences between the inside and the outside. Examples of means for providing natural ventilation are an open window, a vent or a damper provided in the building envelope in e.g. a wall or a roof or as part of a ductwork.

The term "mechanical ventilation" covers use of powered equipment e.g. fans and blowers, to move air in and/or out of the building.

Other means of ventilation may be used as well, including mechanical ventilation with heat recovery, where heat inside the building is used for heating up air coming from the outside, such that it is not as cold as it would be without heat recovery, or natural pulse ventilation, which is natural ventilation activated at certain intervals, for example briefly opening the window for for example one minute and then closing it again.

Controlling ventilation means implies activation and deactivation as well as the level of ventilation and the control of the ventilation via the measurements from sensors and the user setting of the system. It is thereby possible to use only natural ventilation for ventilating the indoor area or only to use mechanical ventilation depending on either user preferences or the selected ventilation mode.

Examples of control parameters, both fixed and adjustable, comprise: night ventilation set point, mechanical ventilation during the night (yes/no), mechanical night cooling (yes/no), pulse ventilation, heat set point, outdoor temperature set point, indoor temperature set point, $CO_2$ threshold value, cooling set point, wind set point, rain (yes/no) etc. Whether a control parameter is adjustable or fixed depends on the selected mode. When a control parameter is adjustable it means that either the value is adjustable, e.g. the indoor temperature set point is adjustable from 22° C. to 23° C. or a ventilation means is adjustable. For example should there be mechanical ventilation during the night yes or no. This choice may be available in one mode. On the other hand mechanical ventilation may be deactivated in a certain mode, and thereby the mechanical ventilation during the night has a fixed value, namely no.

The indoor area may be a whole building or it may be a part of a building such that the building is divided into zones that may be controlled separately. It may also be so that the individual control parameters are controlled by an administrator centrally for the whole building within the given limits of the mode, and modes are selected by the users in the individual rooms or indoor areas. This contributes to a better indoor climate as the different zones may be ventilated by different ventilation means depending on the need and/or desire in a specific indoor area.

The control parameters may comprise an outdoor temperature set point, preferably the ventilation modes define different outdoor temperature set points. Evidently by setting an outdoor temperature point, the temperature of the air outside may be taken into consideration, when choosing between e.g. natural ventilation or mechanical ventilation. The outdoor temperature set point may be both a fixed or an adjustable control parameter. If it is fixed it is determined by the mode, if it is adjustable it is adjustable within certain limits depending on the mode. The outdoor temperature is not adjustable in itself, but the ventilation means may be controlled in response the outdoor temperature set point.

The purpose of this being to provide a better indoor climate accommodated to the users' needs. When setting different outdoor temperature set points, for example if a low outdoor temperature set point is set for one of the modes, such as 0° C., the system will rely on natural ventilation to a greater extent and thereby reducing the amount of energy consumed by air handling units such as fans or blowers. If a higher outdoor temperature set point is set for one of the modes, for example 15° C., the system will to a greater extent rely on the mechanical ventilation as the temperature more often will be below the outdoor set point temperature, at least in a climate with changing seasons. The air may be conditioned by an air handling system or unit comprising among other means for heating, cooling, humidify or dehumidify and/or filtering the air before it enters the indoor area, and thereby making it more comfortable for the users of the building. For heating the air a heat exchanger or a heating coil may be used.

The adjustable control parameters may comprise an indoor temperature set point, preferably the ventilation modes define different indoor temperature set points. In this way a user can influence the system such that at least a desired range of the indoor temperature can be maintained, contributing to a better indoor climate from the users standpoint. The different indoor temperature set points allow the indoor temperature set point to be associated with a particular mode.

The adjustable control parameters may comprise an indoor air quality threshold value, preferably the ventilation modes define different indoor air quality threshold values, such that if the air quality is reduced, e.g. the $CO_2$ content is above a certain threshold value more ventilation may be provided. An air quality sensor may be provided to measure the content of one or more of $CO_2$, humidity, radon, volatile organic compounds (VOCs) or bio-effluents in the air.

VOCs are emitted by a wide array of objects comprising: paints and lacquers, paint strippers, cleaning supplies, pesticides, building materials and furnishings, office equipment such as copiers and printers, correction fluids and carbonless copy paper, graphics and craft materials including glues and adhesives, permanent markers, and photographic solutions etc. Although not all of them are noticeable they do affect the indoor climate and by setting a threshold value, the content of anyone of the above in the air can be reduced.

Bio-effluents are emitted by people and include $CO_2$, methane, odors etc. It has been shown that often there is a relationship between the content of $CO_2$ in the air and the amount of bio-effluents in general in the air. This means that instead of measuring on all these different air quality parameters, which are generated by people inside the room, computers etc., it is simpler to merely measuring the $CO_2$ content in the air and base the activation of a particular ventilation means on this measurement. If it is a room where only a few people in generally are present but there are many VOC's emitted from e.g. computer equipment, it may be desirable to measure on one of these other parameters as well.

When speaking of a high air quality threshold value, this corresponds to a low air quality. For example is a high threshold value is accepted for $CO_2$, this results in a low air quality.

Each ventilation mode may comprise alternative settings, and each alternative setting is associated with the set of adjustable control parameters, each having an adjustable value selected among a group of mode dependent adjustable values, and/or a set of fixed control parameters each having a mode dependent fixed value. By adding alternative settings another dimension is added to the modes. This alternative setting may be a season setting. For example each mode may be associated with one or more of a winter setting, a transitional setting (fall/spring), a summer setting where no mechanical cooling is provided and a summer setting where mechanical cooling is provided. If there is three alternative settings and three ventilations modes, all in all nine different ventilation options are present. So the mode dependent fixed values and the mode dependent adjustable values may also depend on this alternative setting. The advantage is that a better combination of ventilation means is obtained in terms of for example energy consumption, economy and/or user satisfaction when this alternative setting is also taken into consideration.

Each ventilation mode may be associated with a consumption of a different amount of energy for providing the desired indoor climate. The system selects the optimal means of ventilation, thereby the user does not have to consider how the natural ventilation and mechanical ventilation or other ventilation means are mixed and used most sensibly.

The energy consumed is not only tied to the amount of energy consumed by each means of ventilation but the overall picture is considered. For example when using natural ventilation and a window is opened, very little energy is used for air movement. However, if it is cold outside it will require energy to heat up the indoor area again after ventilating where cooler air has entered the indoor area. This is taken into consideration of the different modes and the natural ventilation and mechanical ventilation or other ventilation means is controlled accordingly. For all modes the purpose is to provide the user with a comfortable indoor climate given the user selected mode.

The adjustable control parameters may comprise an indoor maximum temperature threshold value and an indoor minimum temperature threshold value defining an indoor temperature range, wherein the ventilation mode associated with the lowest amount of energy consumption defines an indoor temperature range that is wider than an indoor temperature range defined by a ventilation mode with a higher amount of energy consumption. In a mode with a low energy consumption the indoor temperature is allowed to vary more such that when it is cold outside, a lower temperature inside is accepted, before the heat or mechanical ventilation with heat recovery is activated, thereby reducing the amount of energy needed to heat the indoor area in order to reach the desired temperature range.

Instead of or in addition to the indoor temperature, the ventilation modes may be associated with different indoor maximum air quality threshold values, such that the adjustable control parameters may comprise an indoor maximum air quality threshold value, wherein the ventilation mode associated with the lowest amount of energy consumption defines an indoor maximum air quality threshold value, which is lower than the indoor maximum air quality threshold value defined by a ventilation mode with a higher amount of energy consumption. Consequently a higher content of e.g. $CO_2$ is accepted when it is decided to use less energy. If it is cold outside and the $CO_2$ levels are high, mechanical ventilation may be combined with ventilation with heat recovery such that the temperature level is kept inside and while the $CO_2$ level is reduced as well.

According to a preferred embodiment the ventilation mode is selected by a user. This gives the user the control over the indoor climate instead of the system merely decides what should be done, based on measured values from sensors.

According to a second aspect a system for controlling ventilation of an indoor area of a building is provided, comprising:
 a natural ventilation means,
 a mechanical ventilation means,
 a sensor, and
 a control unit configured for ventilating the indoor area by activating the natural ventilation means and the mechanical ventilation means according to a ventilation mode selected among a plurality of ventilation modes, a set of adjustable control parameters and at least one measurement value from the sensor, wherein each ventilation mode is associated with the set of adjustable control parameters, each having an adjustable value selected among a group of mode dependent adjustable values, and/or a set of fixed control parameters each having a mode dependent fixed value,
 the control unit is configured for controlling the mechanical ventilation means and the natural ventilation means by comparing the measurement value from the sensor with a corresponding value of the control parameters of the ventilation mode such that a desired indoor climate defined by the ventilation mode is obtained.

A sensor may be a thermometer, a clock, a calendar, a $CO_2$ sensor, a light sensor, a PIR sensor detecting presence in the room, an anemoscope, an anemometer, a rain sensor, a humidity sensor, a radon detector or other air quality detector.

The one or more sensors may be provided separately from the control unit or they may be provided incorporated into the control unit.

According to a third aspect a control unit for controlling ventilation of an indoor area of a building is provided, the control unit is configured for ventilating the indoor area by activating the natural ventilation means and the mechanical ventilation means according to a ventilation mode selected among a plurality of ventilation modes, a set of adjustable control parameters and at least one measurement value from the sensor, wherein each ventilation mode is associated with the set of adjustable control parameters, each having an adjustable value selected among a group of mode dependent adjustable values, and/or a set of fixed control parameters each having a mode dependent fixed value,
 the control unit is configured for controlling the mechanical ventilation means and the natural ventilation means by comparing the measurement value from the sensor with a corresponding value of the control parameters of the ventilation mode such that a desired indoor climate defined by the ventilation mode is obtained.

The advantages of the second and third aspects have been explained in the above description, and reference is made thereto.

Anyone of the features from the first aspect may be combined with the features from the second or third aspect.

Figure 2:
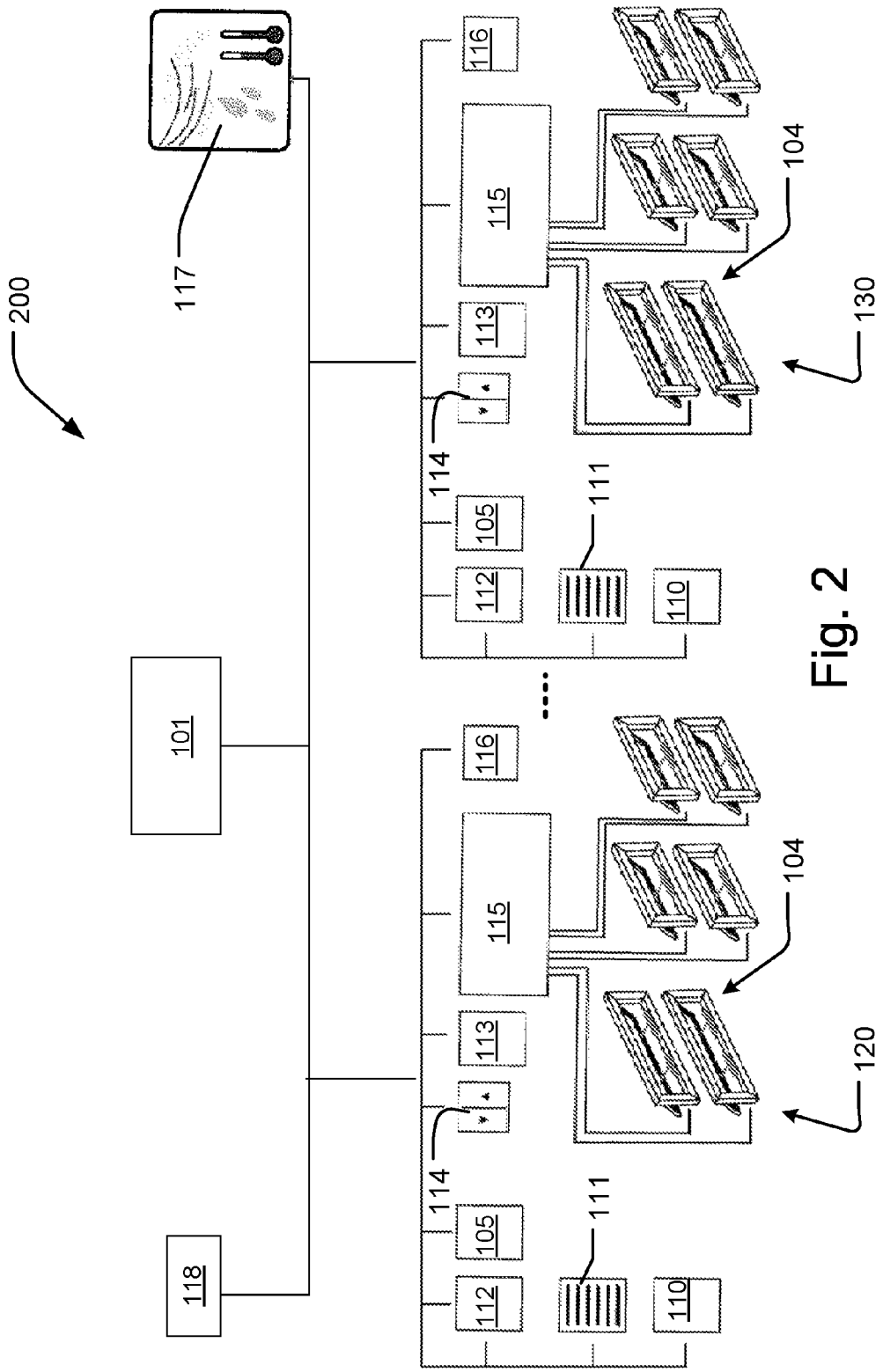
Figure 3:
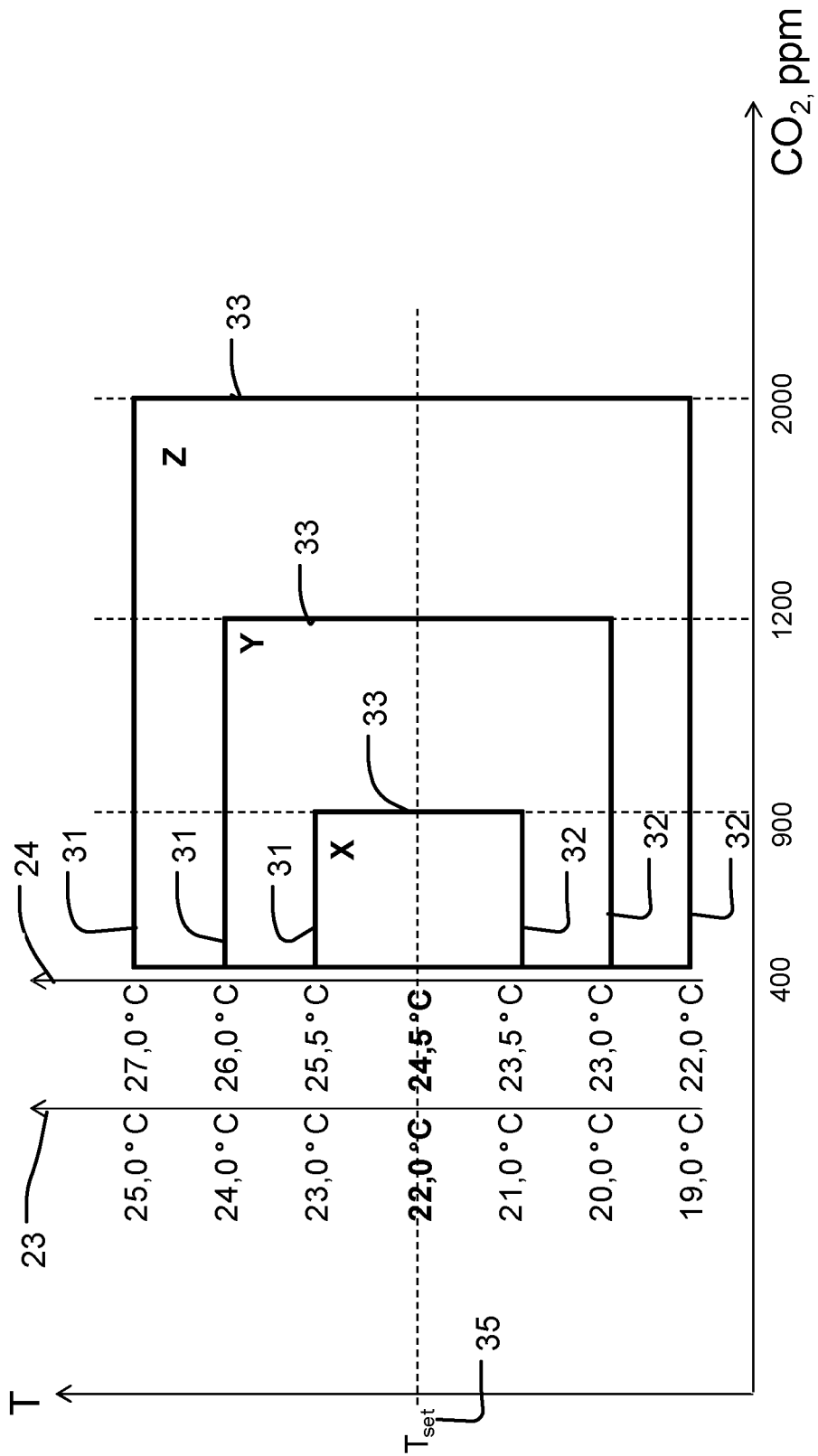

In the following, the invention will be described in further detail with reference to the drawings in which:

FIG. 1 is a diagram showing an implementation of a first embodiment of a system according to the invention, FIG. 2 is a diagram showing an implementation of a second embodiment of a further development of the system according to the invention, FIG. 3 is a diagram showing modes X, Y and Z according to an embodiment of the invention, FIGS. 4-9 are diagrams showing the function of the invention in different ventilation modes under different conditions, also called ventilation schemes.

FIG. 10 is a diagram showing an embodiment of a combination between three alternative settings and three ventilation modes and the consequences on the ventilation means and the control parameters.

FIG. 1 shows a basic embodiment of a system 100 according to the invention. The system 100 is used for supplying ventilation in a building or in a part of a building. The system 100 comprises a control unit 101, here functioning as a central control unit, having a user interface such as a key pad or a touch screen. The control unit 101 is adapted to activate different means of ventilation, depending on the measurement from the indoor temperature sensor 102 and the outdoor temperature sensor 103. The different ventilation means comprise natural ventilation means 104 in the form of one or more windows alternatively it may be dampers or vents, mechanical ventilation means 105 in the form of a power driven ventilator, alternatively it may be a fan or ductwork distributing the air, and ventilation means with heat recovery 106 such as an heat exchanger or heat pump in connection with the mechanical ventilation. Further sensors or measurement equipment may be coupled to the system including a $CO_2$ sensor, a light sensor, a PIR sensor detecting presence in the room, an anemoscope, an anemometer, a rain sensor, a humidity sensor both indoors and outdoors, a radon detector or other air quality detector. The measurement values from these may be taken into consideration when controlling the ventilation. The ventilation means 104, 105, 106 are controlled in response to the measurement value received from the outdoor temperature sensor 103 and the indoor temperature sensor 102 by the control unit 101. How the system 100 is controlled, meaning what kind of ventilation means i.e. mechanical ventilation means, natural ventilation means or ventilation means with heat recovery is activated on what conditions, is determined based on three different modes, X, Y and Z. Each mode is associated with a different amount of energy consumption. Each mode may also be associated with a different season or outdoor temperature. Additionally each mode is associated with twelve different ventilation schemes. These schemes and the modes X, Y and Z will be explained in further detail below.

The system 100 may be ventilating a whole building or just a part of a building. The building may be divided into zones such that each zone is controlled by a control unit on the local level where minor adjustments such as setting of the modes and setting of the indoor temperature set point may be performed, while the more substantial settings, e.g. the indoor maximum and minimum temperature threshold values, ventilation of the indoor area when there are no people present and other control parameters, may be controlled centrally for the whole building from a central control unit. An example of a system divided into zones is shown in FIG. 2.

FIG. 2 shows a further developed embodiment of the invention. A system 200 is divided into two zones 120, 130. One or more zones may be present. A control unit 101, here functioning as a central control unit and will be called a central control unit in the following description for FIG. 2, controls both zones 120, 130. The central control unit 101 receives measurements from various sensors comprising one or more indoor sensor(s) 113 measuring temperature, humidity and $CO_2$ content in the air, a light sensor 112, a passive infrared (PIR) sensor 110 one or more outdoor weather sensor(s) 117 measuring temperature, wind speed, wind direction and rain. The system further comprises a power supply 118. The outdoor weather sensor 117 may also measure outdoor air quality parameters. Each zone comprises six windows controlled by an actuator controller 115. The actuator controller 115 may control the natural ventilation 104 in one or more zones. A variable number of windows may be present in each zone.

The system 200 is furthermore equipped with a sunscreen 111. Approximately 3-5 times more energy is spent on cooling a building compared to heating a building, meaning that one or more sunscreens shielding the light coming from the windows can contribute to reducing the energy costs considerably.

A heating device 116, such as a radiator is furthermore provided in each zone 120, 130 as well as mechanical ventilation 105. The mechanical ventilation 105 may merely contribute to the distribution of the outside air in the building, or the air may be heated or cooled before it enters the building. Preferably, if the outside air is below 15° C., the air is heated to e.g. approx. 15° C. before it enters the indoor area, such that the air does not cool down the indoor area too much. Besides the central control unit 101, each zone is provided with a local user controller 114 that may be used to select the ventilation mode or regulate the desired set point temperature or other settings that are desirable to control locally. For example, each of the zones may also reflect a room and if one of the rooms is filled with people it is practical that the ventilation is adjusted for this room and not necessarily for the remaining rooms or zones. This is performed no matter if you are in an X, Y or Z mode, but the ventilation means used and/or the threshold values may be different for each of the modes. On the other hand an outdoor air quality detector (not shown) may be positioned outside, such that for example windows are kept closed if there is a high concentration of smog in the air and air coming through the mechanical ventilation 105 is filtered before it enters the indoor area. This is preferably controlled centrally.

A default mode set centrally may also be provided such that the user of the indoor area may set the system to the X mode locally, but at the end of the day when the people has left the indoor area, the mode is set back to the Z mode automatically.

The system 200 is adapted to control the indoor climate according to a set of modes X, Y and Z. Thus, the ventilation means 104, 105, 106 (not shown) and heating 116 is controlled based on preferably three modes and the measurements from the various sensors 110, 112, 113, 117. Each of the modes X, Y, Z is associated with 12 ventilation schemes—which will be described in detail below. For each ventilation scheme a combination of natural ventilation 104, mechanical ventilation 105, natural pulse ventilation, which is natural ventilation activated at certain intervals, and/or heating 116 or cooling is determined. The combination of the means of ventilation in each of the twelve schemes is to a wide extent the same for all three modes. A particular ventilation scheme is determined and executed based on the measurements from the various sensors 110, 112, 113, 117. What differentiate the modes X, Y and Z from each other are the outdoor temperature set point and an indoor maximum temperature threshold value and an indoor minimum temperature threshold value. Each mode is at least associated with the outdoor temperature set point and the indoor maximum temperature threshold value for the indoor temperature set point and the indoor minimum temperature threshold value for the indoor temperature set point.

The outdoor temperature set point for each mode may be selected from one of the following ranges: 0-5° C., 5-10° C. and 10-15° C., respectively. In other climates or based on user preferences or building codes, other ranges may be used.

The modes X, Y and Z are preferably also associated with one or more threshold values for (a) measurement value(s) from the indoor sensor(s) 113. So depending on what the measurement values are from the various sensor(s) and the selected mode a certain ventilation scheme is executed.

The advantage of controlling both ventilation means and heating or cooling from a central control unit 101 is that as a user it may be difficult to see the overall consequences of regulating on one parameter (ventilation means and heating or cooling devices) on the remaining parameters. By joining all of these parameters in one system, the user only has to decide e.g. a desired temperature and a mode, and the system will regulate the ventilation means and heating or cooling devices accordingly. Thereby all parameters are considered and the optimal mix of heating and ventilation is obtained while the amount of energy—and thereby the economy—is taken into consideration as well.

FIG. 3 shows a diagram of an implementation of the modes. Three modes X, Y and Z are shown, more modes may be present. Each of the different modes X, Y and Z are associated with an indoor temperature set point 35, selected by the user or administrator, and a set of indoor maximum temperature threshold values 31 and indoor minimum temperature threshold values 32 for the indoor temperature set point defining an indoor temperature range and, in this case, an air quality threshold value 33 for the $CO_2$ content of the air inside the building. Furthermore two temperature ranges are defined representing an indoor temperature in the winter 23 and an indoor temperature in the summer 24. All three modes X, Y and Z have the same indoor temperature set point 35. What differ between the modes in this figure are the indoor minimum and maximum temperature threshold values 31, 32. Although positioned symmetrically around the indoor temperature set point 35, mode X has a narrower temperature range than mode Y and mode Z meaning that the indoor temperature should not change much from the indoor temperature set point 35 before a particular ventilation scheme 1-12 (see FIGS. 4-9) is activated in order to bring back the indoor temperature to the indoor temperature set point 35.

Often it requires energy to adjust the temperature in the building or in the zone. Additionally the threshold value 33 for the $CO_2$ content of the air inside the building also varies for each of the modes. In the Z mode a greater content of $CO_2$ in the air is accepted than in the X and Y mode. Because a smaller content of $CO_2$ is accepted in the X mode it is necessary to ventilate the indoor area more. If the ventilating is performed by mechanical ventilation, both conditioning and moving of the air requires energy. In order to keep the indoor temperature close to the indoor set point temperature 35 and the $CO_2$ content in the air low, more energy is required, than for example in the Y or Z mode, where indoor temperature minimum and maximum threshold values 31, 32 are further apart and the air quality threshold value 33 for the $CO_2$ content in the air is higher.

Within these temperature and air quality threshold values 31, 32, 33, or other threshold values set within the present threshold values it may also be so that no ventilation is required and therefore not activated as both the indoor temperature and the $CO_2$ content are within these other temperature and air quality threshold values. These other threshold values may be set for a specific mode such as the Z mode, such that for example the an indoor temperature range between 22-23° C. and an air quality threshold value below 900 ppm, requires no ventilation.

Instead of $CO_2$ other factors may be measured as well, and a ventilation scheme may be started when the air quality threshold value 33 are exceeded for these factors such as humidity, radon, bio-effluents or volatile organic compounds (VOCs). VOCs are emitted by a wide array of products including: people, paints and lacquers, paint strippers, cleaning supplies, pesticides, building materials and furnishings, office equipment such as copiers and printers, correction fluids and carbonless copy paper, graphics and craft materials including glues and adhesives, permanent markers, and photographic solutions.

Figure 4:
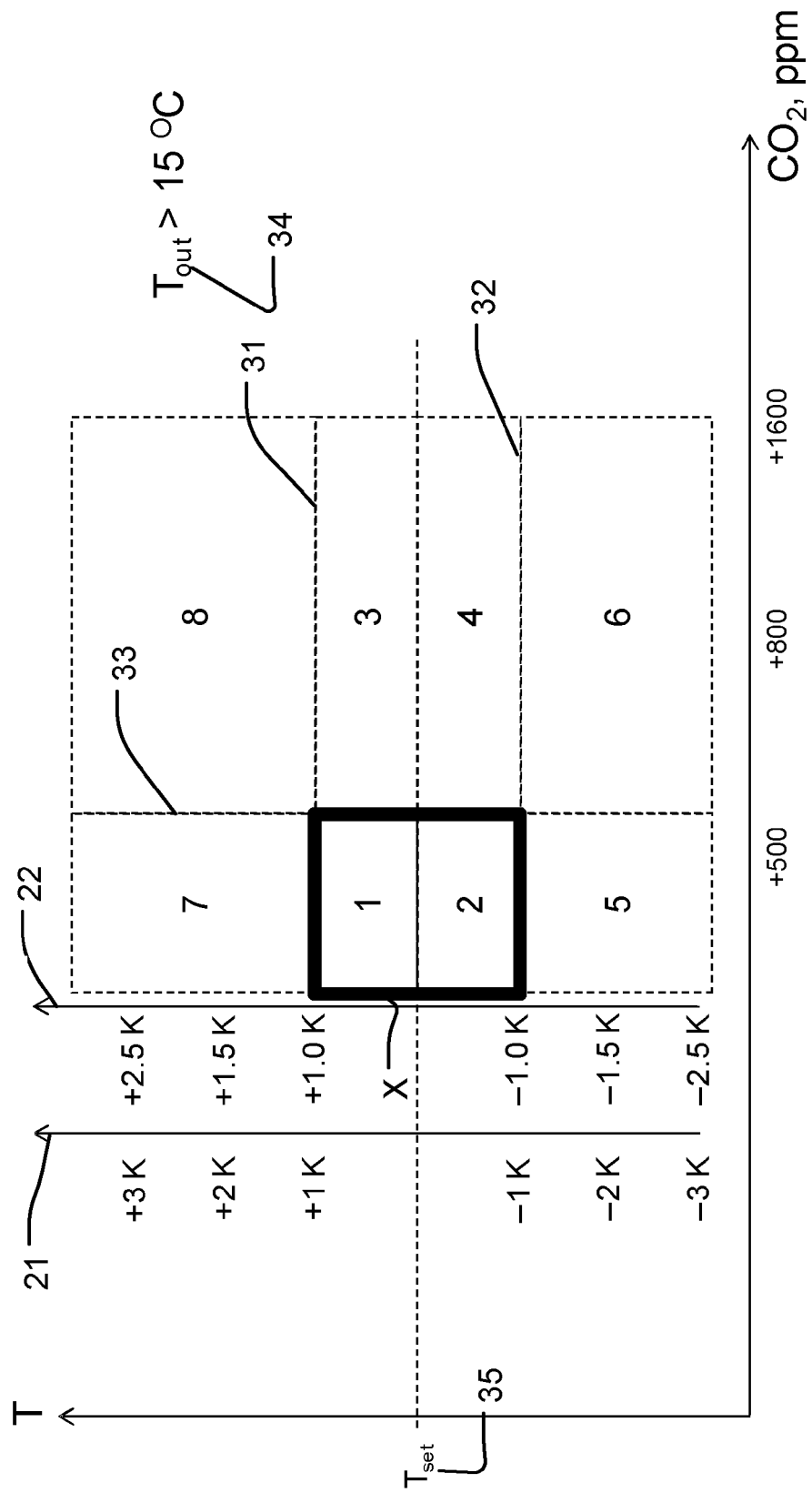
Figure 5:
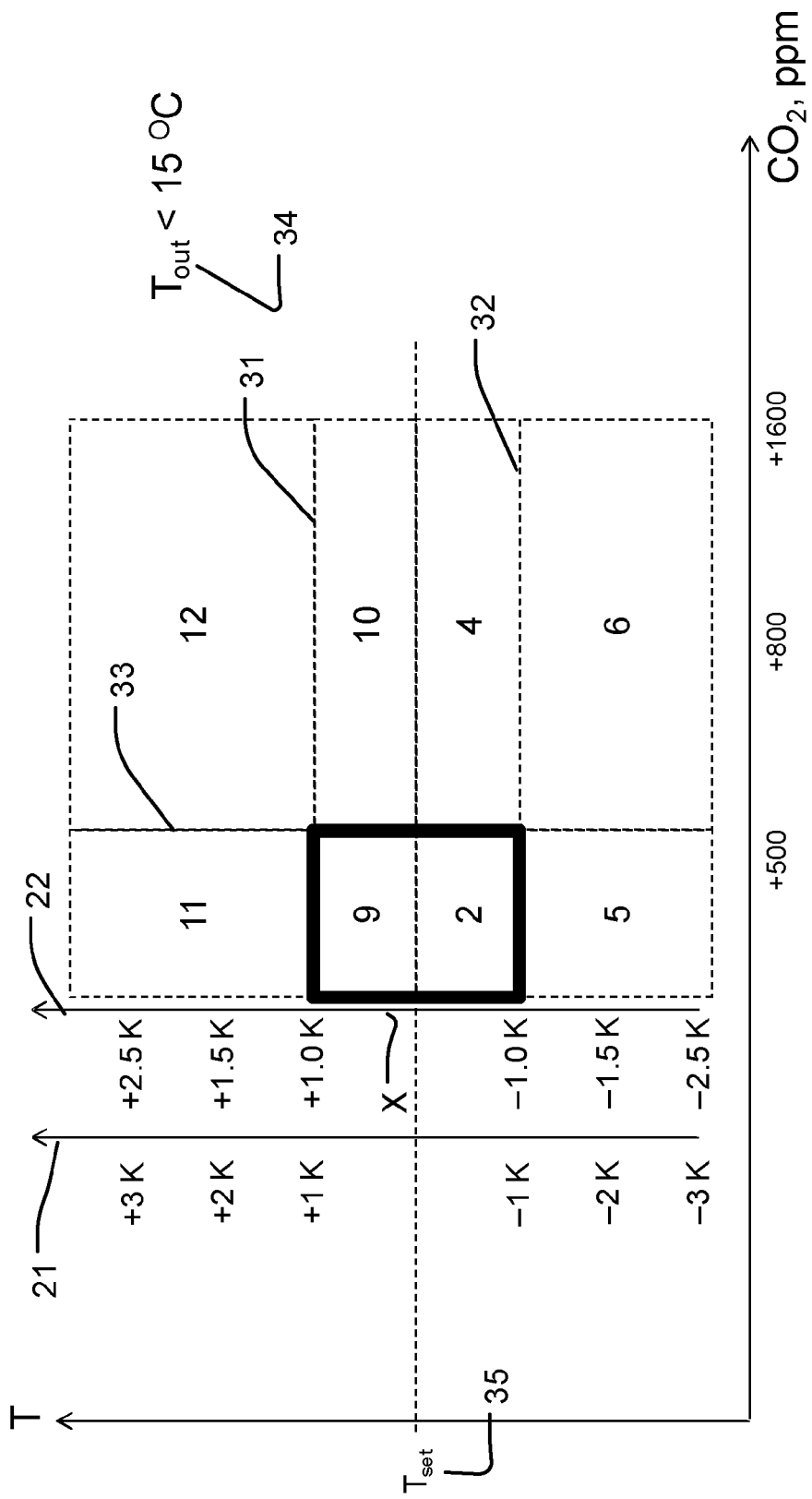

FIGS. 4 and 5 show the mode X and the ventilation schemes applied under different conditions. The indoor temperature range is represented on a scale for the wintertime 21 and the summertime 22. The mode X is in the present example characterized by a great focus on the indoor climate in the sense that the indoor temperature is kept very close to the indoor temperature set point 35 and the $CO_2$ content in the air is kept at a minimum. The natural ventilation channels such as windows are only opened when the outdoor temperature is above 15° C. The mode X uses more energy than the modes Z and Y because mechanical ventilation is used more frequently than natural ventilation compared to the Y and Z mode. Here the indoor maximum and minimum temperature threshold values 31, 32 are set only one degree Kelvin (K) from the indoor temperature set point 35 and only 500 ppm of $CO_2$ content in the air inside is allowed before the ventilation scheme is changed. These indoor temperature and air quality threshold values may vary as desired by the user or administrator. Each ventilation scheme in FIGS. 4-9 is denoted from 1-12. In the mode X in FIGS. 4 and 5 the outdoor temperature set point 34 is set to 15° C. At this temperature or higher (at least to a certain extent) if natural ventilation e.g. in the form of a window is activated/opened, it will feel like a pleasant breeze. For this reason the indoor area is ventilated by means of natural ventilation in ventilation scheme 1 if the measurement value from the outdoor temperature sensor is above the outdoor temperature set point 34 and the measurement value from indoor temperature sensor is between the indoor maximum temperature threshold value 31 for the indoor temperature set point and the indoor temperature set point 35. This ventilation scheme can also be seen in FIGS. 6 and 8.

If the measurement value from the indoor temperature sensor is between the minimum temperature threshold value 32 for the indoor temperature set point and the indoor temperature set point 35 the indoor area is ventilated by means of mechanical ventilation and ventilation with heat recovery 2, in order to retain the heat inside. The ventilation with heat recovery may be performed by a heat exchanger coupled to a ventilation ductwork. This ventilation scheme can also be seen in FIGS. 4-9.

If the measurement value from the indoor temperature sensor is below the minimum temperature threshold value 32 for the indoor temperature set point the mechanical ventilation and ventilation with heat recovery is supplemented by heating 5, performed by a heating device such as a radiator. This ventilation scheme can also be seen in FIGS. 4-9, irrespectively of the outdoor temperature being above or below the outdoor temperature set point 34.

If the measurement value from the indoor temperature sensor is above the maximum temperature threshold value 31 for the indoor temperature set point the indoor area is ventilated by means of natural ventilation 7, 8. Alternatively if it is particularly hot outside, and the outdoor temperature is above a certain threshold value, the natural ventilation may be deactivated and the mechanical ventilation together with a cooling device 7 8, e.g. an air conditioner, may be activated instead. Besides in FIG. 4, this ventilation scheme can also be seen in FIGS. 6 and 8 where the outdoor temperature is above the outdoor temperature set point 34.

If on the other hand the outdoor temperature is below the outdoor temperature set point 34, as can be seen in FIG. 5, the indoor area is ventilated by means of mechanical ventilation supplemented by either a cooling device 11, 12, e.g. if the indoor temperature is pretty high e.g. 7 K above the indoor maximum temperature threshold value, or by natural ventilation 11 and 12, e.g. if the opening of a window will contribute to cooling of the indoor area either due to temperature differences between the inside and the outside or due to the wind. This ventilation scheme can also be seen in FIGS. 7 and 9 where the outdoor temperature is below the outdoor temperature set point 34.

Figure 6:
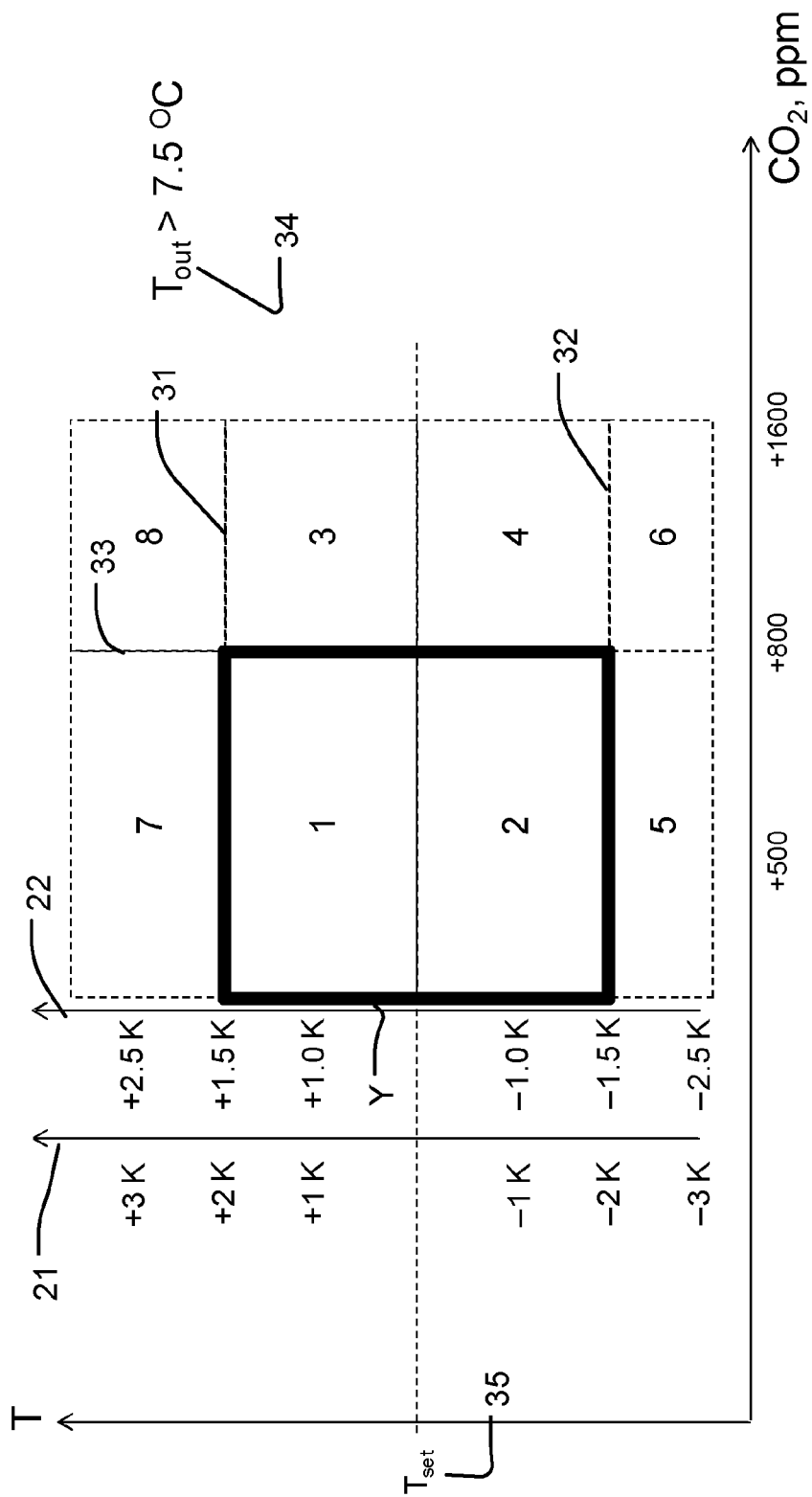
Figure 8:
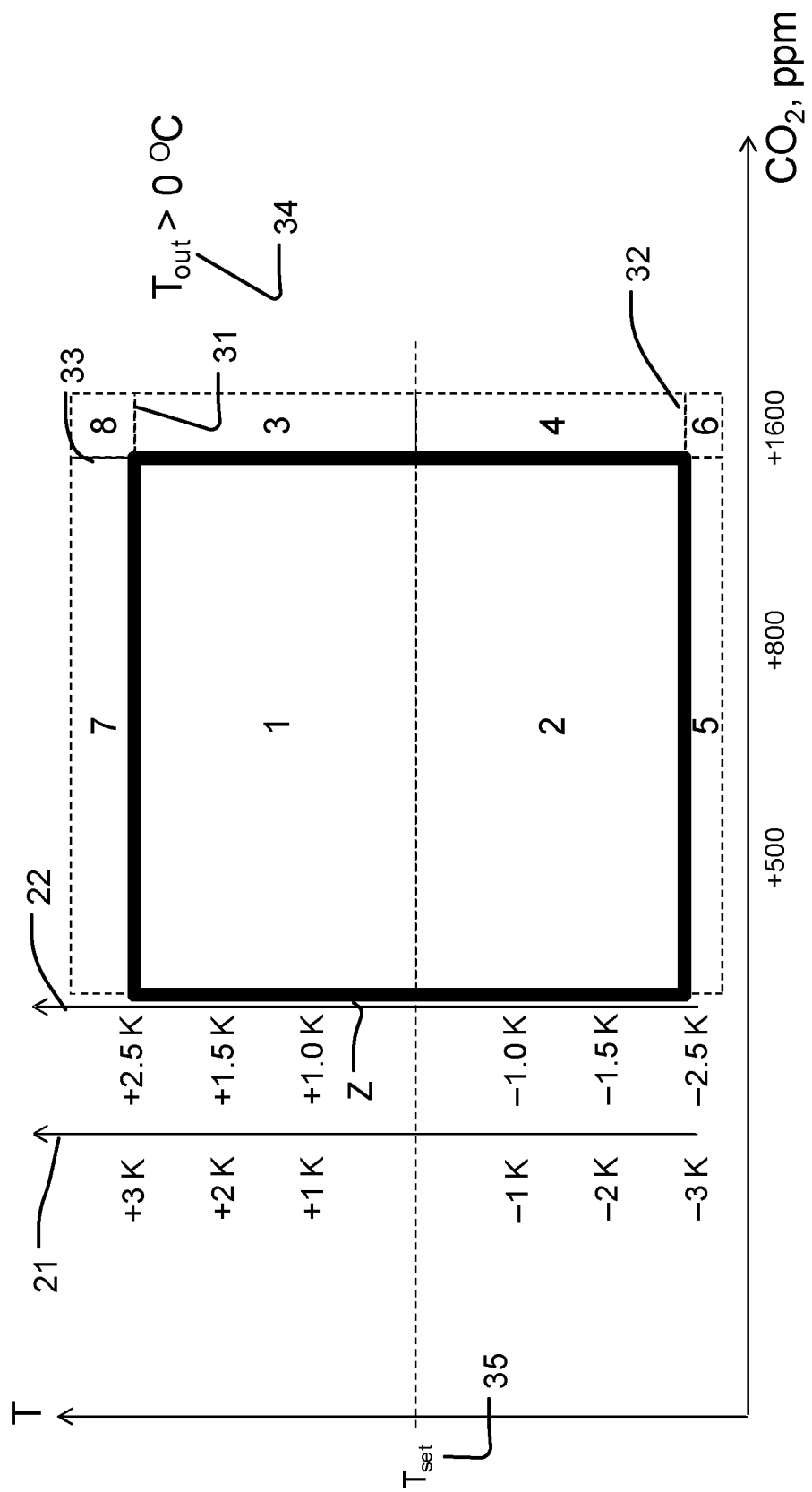

As can be seen in FIGS. 4, 6 and 8 the indoor area is ventilated by means of natural ventilation and mechanical ventilation 3 if the measurement value from indoor temperature sensor is between the maximum indoor temperature threshold value 31 for the indoor temperature set point and the indoor temperature set point 35 and the measurement value from the indoor air quality sensor is above the set air quality threshold value 33, and the measurement value from outdoor temperature sensor is below the outdoor temperature set point 34. Thereby the natural ventilation is supplemented by mechanical ventilation if the $CO_2$ content in the air is above the air quality threshold value 33 in order to increase the air change in the indoor area.

As can be seen in FIGS. 4-9 the indoor area is ventilated by means of mechanical ventilation and ventilation with heat recovery supplemented by natural pulse ventilation 4 if the measurement value from the indoor temperature sensor is between the minimum temperature threshold value 32 for the temperature set point and the indoor temperature set point 35 and the measurement value from an indoor air quality sensor is above the set air quality threshold value 33. Natural pulse ventilation means that the natural ventilation, e.g. the windows in the building, is only opened for a short period of time when the air outside is below the outdoor temperature set point. Opening the windows for a longer period may contribute to what feels like a draft. Instead if the natural ventilation is activated for only 5-10 minutes, it will contribute to the air change in the indoor area and the room will not get too cooled down. The natural pulse ventilation may be performed at intervals, e.g. every hour or when required.

As can be seen in FIGS. 4-9 the indoor area is ventilated by means of mechanical ventilation, ventilation with heat recovery and natural pulse ventilation and heating the indoor area by means of a heating device 6 if the measurement value from the indoor temperature sensor is below the minimum temperature threshold value 32 for the temperature set point and the measurement value from the indoor air quality sensor is above the set air quality threshold value 33.

Figure 7:
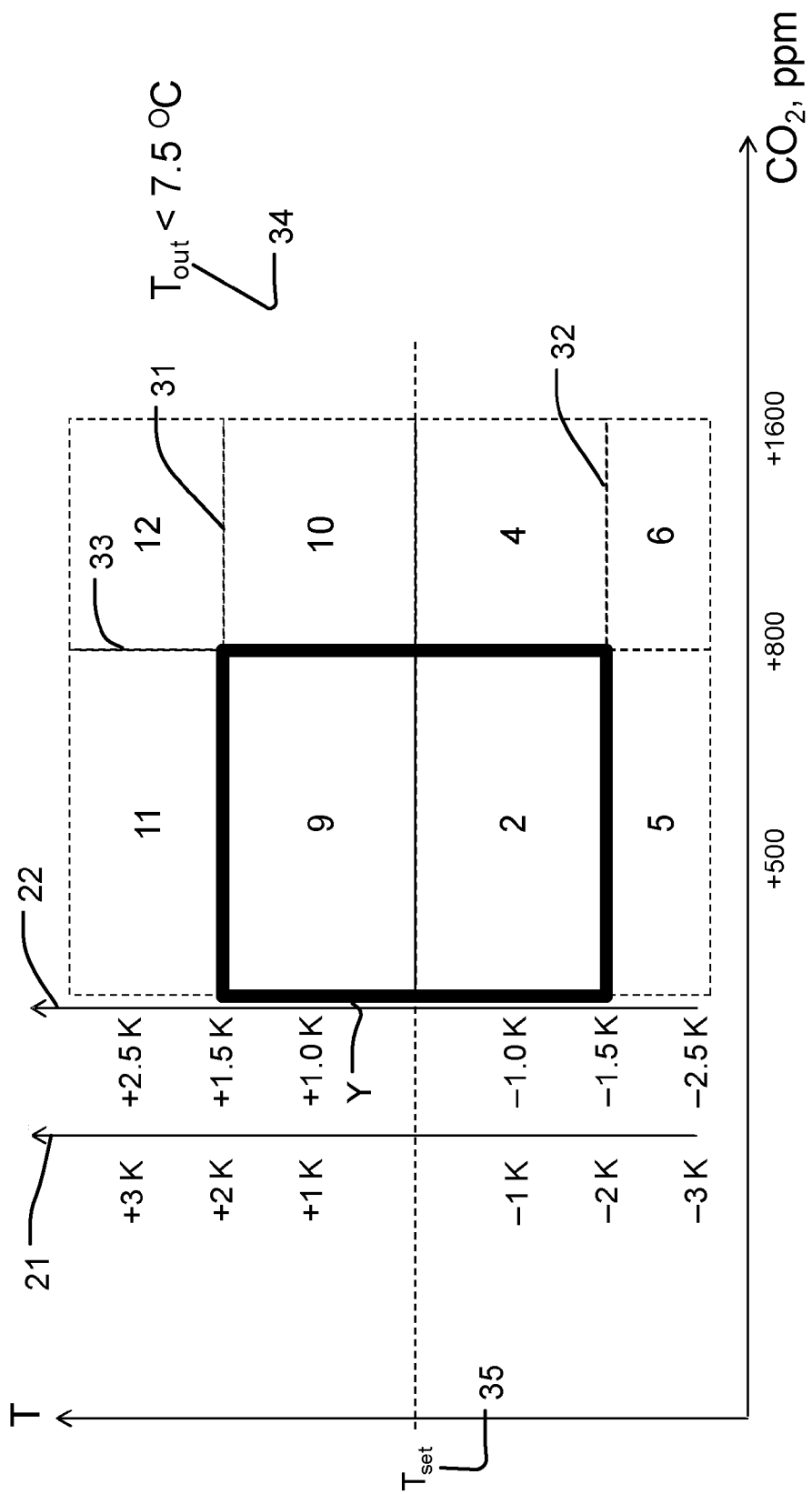
Figure 9:
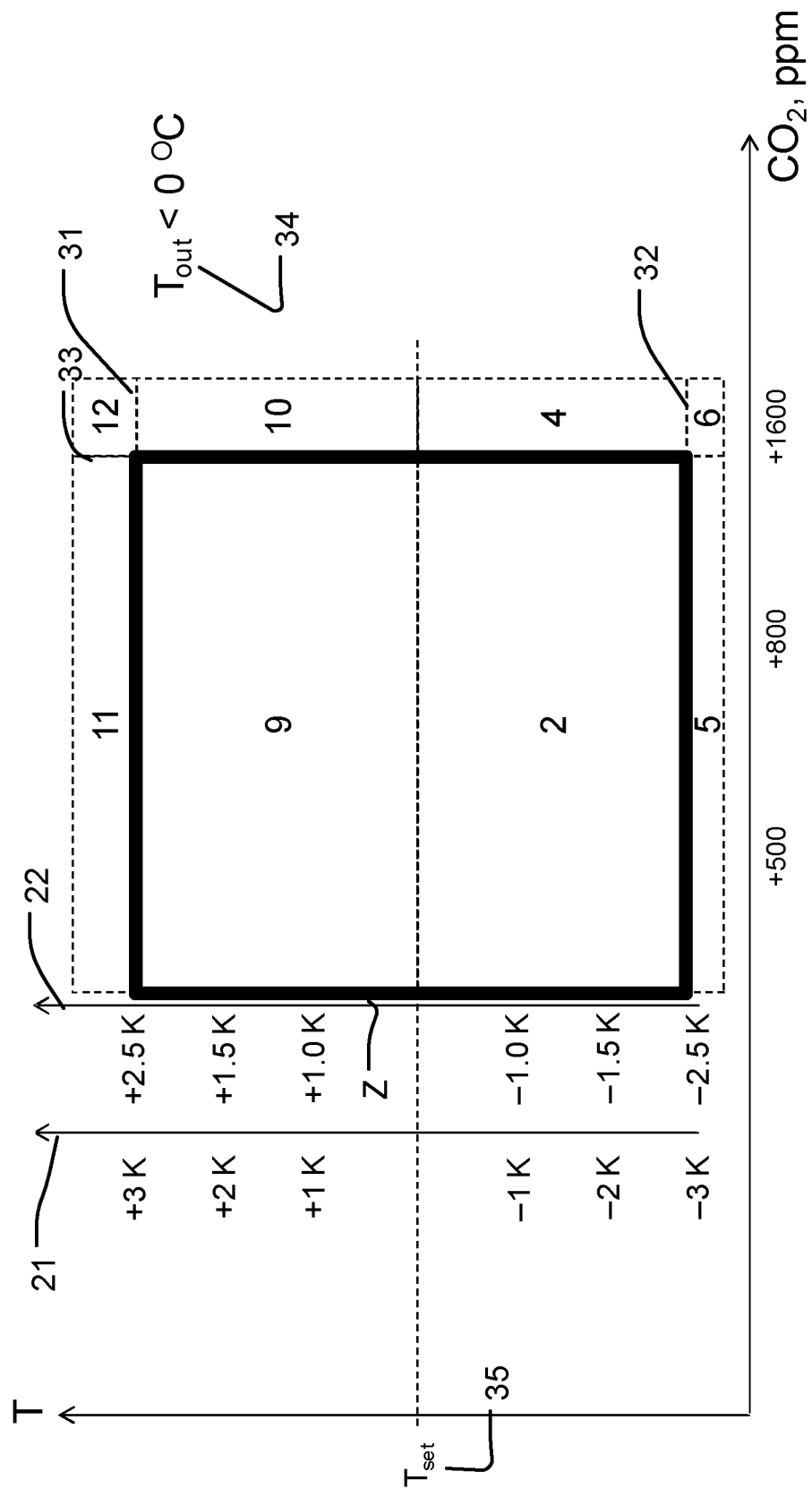

As can be seen in FIGS. 5, 7 and 9 the indoor area is ventilated by means of mechanical ventilation 9 if the measurement value from the outdoor temperature sensor is below the outdoor temperature set point 34.

The indoor area is ventilated by means of natural pulse ventilation and mechanical ventilation 10 if the measurement value from indoor temperature sensor is between the maximum temperature threshold value 31 for the indoor temperature set point and the indoor temperature set point 35 and the measurement value from the indoor air quality sensor is above the set air quality threshold value 33, and the measurement value from outdoor temperature sensor is below the outdoor temperature set point 34.

Other factors besides temperature and $CO_2$ content in the air may be taken into consideration. For example it may be a condition that the wind speed is below a certain wind speed set point, such as 8 m/s in order for the natural ventilation to be activated. If the wind speed is above this set point the natural ventilation is replaced by the mechanical ventilation or if the wind speed is above this set point windows or other sources of natural ventilation is only opened on the leeside of the building. The windows may also be left only half open if it is windy, such as wind speeds above 8 or 12 m/s. If it is raining the natural ventilation may also replaced by the mechanical ventilation.

Looking across the FIGS. 4-9 the scale for the wintertime 21 and summertime 22 the indoor maximum and minimum temperature threshold values 31, 32 are not the same for all modes. For the Y and Z modes in FIGS. 6, 7 and FIGS. 8, 9 respectively, the indoor maximum and minimum temperature threshold values 31, 32 varies. In the mode Y the indoor maximum temperature threshold value 31 is set to 2 K above the indoor temperature set point 35 and in the summer the indoor maximum temperature threshold value 31 is set to 1.5 K above the indoor temperature set point 35. The indoor maximum and minimum temperature threshold value 31, 32 may be changed by the user within certain limits as defined by the mode.

FIGS. 6 and 7 show the setting for the mode Y. The mode Y is in general characterized by a obtaining a balance between the indoor climate and the energy consumption. The natural ventilation such as windows is generally used when the outside temperature is above 7.5° C. and when there is a surplus of heat inside or the $CO_2$ content in the air is above the air quality threshold value. The indoor temperature is allowed to vary to a greater extent than in the mode X before the indoor maximum and minimum temperature threshold values 31, 32 and for the temperature and the air quality threshold value 33 for the $CO_2$ content is exceeded and the ventilation scheme is changed.

FIGS. 8 and 9 show the setting for the mode Z. The mode Z is in general characterized by very low energy consumption; the natural ventilation is used to a great extent in particular when the outside temperature is above 0° C. In the summertime natural ventilation is preferably used exclusively and a higher content of $CO_2$ in the air is accepted than in the modes Y and X. The mode Z, and the other modes, may further take presence of people in the indoor area into consideration such that no ventilation or minimum ventilation takes place when there are no people in the indoor area. Additionally the temperature may be lowered at night during the wintertime and cooling by means of a cooling device may be disabled during the summertime, in order to save energy. This applies to the Y mode as well. Likewise pulse ventilation may be disabled as well, as higher $CO_2$ levels may be accepted at least for shorter periods.

When it comes to controlling the system centrally and locally, it may be decided that if the system is set to the Z mode centrally this setting and the associated set point temperature and/or threshold values for e.g. $CO_2$ cannot be overruled by the user locally. It may also be decided that the indoor temperature is allowed to vary plus minus 3 K, but the $CO_2$ content may not exceed 500 ppm.

FIG. 10 show how the different ventilation modes X, Y, Z may be combined with different alternative settings A, B, C and how it affects the control of the ventilation means. For each of the combinations of the ventilation modes X, Y, Z and the alternative settings A, B, C there are some fixed and adjustable control parameters. The alternative settings A, B and C in this embodiment are associated with a season setting. A is associated with winter where there is a need for heating the indoor area, B is associated with summer where no mechanical cooling is required and C is associated with summer where mechanical cooling, such as air condition, is required.

In box 51, 52 and 53 there are generally more adjustable values and a higher energy consumption, while box 57, 58 and 59 generally have more fixed values and a lower energy consumption.

In the following it will be described what characterizes the different combinations.

In box 51, no natural ventilation is used because it is to cold outside, this is a mode dependent fixed value where the outdoor temperature set point is associated the chosen ventilation mode. There is a low indoor air quality threshold value, this is a mode dependent adjustable value where the indoor air quality threshold value may be set even lower, but not higher. This applies to all combinations where the ventilation mode X is used. The indoor area may be ventilated when not in use and there is natural pulse ventilation when the outdoor temperature allows it, these are mode dependent adjustable values. There is a standard indoor temperature set point for turning on the heat, and no lowering of the temperature at night—these are mode dependent fixed values.

In box 52 mechanical ventilation is used if the outdoor temperature is low. Else natural ventilation will be used until a certain air quality threshold value has been reached or until the maximum indoor temperature threshold value has been reached. After that both natural and mechanical ventilation will be used. There is a low maximum indoor temperature threshold value, this is a mode dependent adjustable value and indoor area is ventilated during night, this is a mode dependent fixed value. The outdoor temperature set point is high, this is a mode dependent adjustable value that may be raised but not lowered beyond a certain set point.

In box 53 mechanical ventilation is used if the outdoor temperature is low. Else natural ventilation will be used until a certain air quality threshold value has been reached or until the maximum indoor temperature threshold value has been reached. After that both natural and mechanical ventilation will be used until a further threshold value for the indoor temperature has been reached. When this is reached the natural and mechanical ventilation is turned off and only mechanical cooling in a separate unit, which includes fresh air, is used. Alternatively the mechanical ventilation includes a cooling unit and the mechanical ventilation is not switched off but is instead set to cool the air. The outdoor temperature set point is relatively high, this is a mode dependent adjustable value that may be raised but not lowered beyond a certain set point. Mechanical ventilation or mechanical cooling is allowed during the night time, this is a mode dependent adjustable value.

In box 54, no natural ventilation is used because it is to cold outside, this is a mode dependent fixed value where the outdoor temperature set point is associated the chosen ventilation mode. The air quality threshold value is set to standard as well as indoor heat temperature set point and the lowering of the temperature at night, these are mode dependent fixed values. Natural pulse ventilation may be used dependent on the outdoor temperature set point and the desire of the user, this is a mode dependent adjustable value.

In box 55 mechanical ventilation is used if the outdoor temperature is low. Else natural ventilation will be used until a certain air quality threshold value has been reached or until the maximum indoor temperature threshold value has been reached. After that both natural and mechanical ventilation will be used. The air quality threshold value has been set to standard, as well as the outdoor temperature set point and the night ventilation deactivated, these are mode dependent fixed values.

In box 56 mechanical ventilation is used if the outdoor temperature is low. Else natural ventilation will be used until a certain air quality threshold value has been reached or until the maximum indoor temperature threshold value has been reached. After that both natural and mechanical ventilation will be used until a further threshold value for the indoor temperature has been reached. When this is reached the natural and mechanical ventilation is turned off and only mechanical cooling in a separate unit, which includes fresh air, is used. Alternatively the mechanical ventilation includes a cooling unit and the mechanical ventilation is not switched off but is instead set to cool the air. The air quality threshold value has been set to standard, as well as the outdoor temperature set point and the deactivated night ventilation and mechanical cooling, these are mode dependent fixed values.

In box 57 no natural ventilation is used because it is to cold outside, this is a mode dependent fixed value where the outdoor temperature set point is associated the chosen ventilation mode. The air quality threshold value is set high, this is a mode dependent adjustable value that may be set higher, at least up to a certain limit. There is no ventilation when the indoor area is not in use, and no natural pulse ventilation, these are mode dependent fixed values. There is a lower indoor temperature set point for turning on the heat, for example 1 K lower than for the standard set point in the Y mode, and lowering of the temperature at night, these are mode dependent fixed values.

In box 58 mechanical ventilation is used if the outdoor temperature is low. Else natural ventilation will be used until a certain air quality threshold value has been reached or until the maximum indoor temperature threshold value has been reached. After that both natural and mechanical ventilation will be used. The air quality threshold value has been set higher than the standard set point, and the outdoor temperature set point has been set lower than the standard indoor temperature set point, these are mode dependent adjustable values. There is no ventilation during the night, this is a mode dependent fixed value.

In box 59 mechanical ventilation is used if the outdoor temperature is low. Else natural ventilation will be used until a certain air quality threshold value has been reached or until the maximum indoor temperature threshold value has been reached. After that both natural and mechanical ventilation will be used. No mechanical cooling is allowed, this is a mode dependent fixed value. The air quality threshold value has been set higher than the standard set point, and the outdoor temperature set point has been set lower than the standard indoor temperature set point, these are mode dependent adjustable values.

The above examples may be supplemented by further control parameters that have either fixed or adjustable values.

Various implementations of the invention may be imagined and is not limited to the above embodiments.

The invention claimed is:

1. A method for controlling ventilation of an indoor area of a building, comprising the steps of:
   ventilating the indoor area by means of mechanical ventilation and natural ventilation according to a ventilation mode selected among a plurality of ventilation modes, a set of adjustable control parameters, and at least one measurement value from a sensor, wherein:
      each ventilation mode is associated with the set of adjustable control parameters, each adjustable control parameter having an adjustable value selected among a group of mode dependent adjustable values,
      each ventilation mode is associated with a set of fixed control parameters each having a mode dependent fixed value, wherein at least one of the mode dependent fixed values of at least one of the plurality of ventilation modes is different from at least one of the mode dependent fixed values of another of the plurality of ventilation modes; and
   controlling the mechanical ventilation and the natural ventilation by comparing the measurement value from the sensor with a corresponding value of the control parameters of the ventilation mode such that a desired indoor climate defined by the ventilation is obtained and wherein the ventilation modes define different indoor temperature set points.

2. A method for controlling ventilation according to claim 1, wherein in each ventilation mode a value of each control parameter, whether fixed or adjustable, of that ventilation mode can be stored so that when switching from a first ventilation mode to a different, second ventilation mode and back to the first ventilation mode again, the control parameters of the first ventilation mode are restored, preferably the parameters can be stored on and restored from an electronic storage device such as a hard disk drive or a solid state drive.

3. A method for controlling ventilation according to claim 2, wherein at least two control parameters of the first mode are each set at different parameters in the second mode.

4. A method for controlling ventilation according to claim 1, wherein switching from one ventilation mode to another can be done by a user activating a single button, icon or the like, whereby at least two control parameters are changed from one mode to the other without the user activating further buttons, icons or the like.

5. A method for controlling ventilation according to claim 1, wherein control of the ventilation is done automatically.

6. A method for controlling ventilation according to claim 1, wherein in at least two of the ventilation modes both mechanical and natural ventilation can be activated dependent on the value from the sensor.

7. A method for controlling ventilation according claim 1, wherein at least one of the set of adjustable control parameters and the set of fixed control parameters comprises at least two control parameters.

8. A method for controlling ventilation according to claim 1, wherein the control parameters comprise an outdoor temperature set.

9. A method for controlling ventilation according to claim 8, wherein the ventilation modes define different outdoor temperature set points.

10. A method for controlling ventilation according to claim 1, wherein the adjustable control parameters comprise an indoor temperature set point.

11. A method for controlling ventilation according claim 1, wherein the adjustable control parameters comprise an indoor air quality threshold.

12. A method for controlling ventilation according to claim 1, wherein each ventilation mode comprises alternative settings, and each alternative setting is associated with the set of adjustable control parameters, each having an adjustable value selected among a group of mode dependent adjustable values, and a set of fixed control parameters each having a mode dependent fixed value.

13. A method for controlling ventilation according to claim 1, wherein each ventilation mode is associated with a consumption of a different amount of energy for providing the desired indoor climate.

14. A method for controlling ventilation according to claim 13, wherein the adjustable control parameters comprise an indoor maximum temperature threshold value and an indoor minimum temperature threshold value defining an indoor temperature range, wherein the ventilation mode associated with the lowest amount of energy consumption defines an indoor temperature range that is wider than an indoor temperature range defined by a ventilation mode with a higher amount of energy consumption.

15. A method for controlling ventilation according to claim 13, wherein the adjustable control parameters comprise an indoor maximum air quality threshold value, wherein the ventilation mode associated with the lowest amount of energy consumption defines an indoor maximum air quality threshold value, which is lower than the indoor maximum air quality threshold value defined by a ventilation mode with a higher amount of energy consumption.

16. A method for controlling ventilation according to claim 13, wherein the ventilation modes define different indoor air quality threshold values.

17. A method for controlling ventilation according claim 1, wherein the ventilation mode is selected by a user.

18. A system for controlling ventilation of an indoor area of a building, comprising:
a natural ventilation means,
a mechanical ventilation means,
a sensor, and
a control unit configured for ventilating the indoor area by activating the natural ventilation means and the mechanical ventilation means according to a ventilation mode selected among a plurality of ventilation modes, a set of adjustable control parameters and at least one measurement value from the sensor wherein:
each ventilation mode is associated with the set of adjustable control parameters,
each adjustable control parameter having an adjustable value selected among a group of mode dependent adjustable values,
each ventilation mode is associated with a set of fixed control parameters each having a mode dependent fixed value, wherein at least one of the mode dependent fixed values of at least one of the plurality of ventilation modes is different from at least one of the mode dependent fixed values of another of the plurality of ventilation modes; and
the control unit is configured for controlling the mechanical ventilation means and the natural ventilation means by comparing the measurement value from the sensor with a corresponding value of the control parameters of the ventilation mode such that a desired indoor climate defined by the ventilation mode is obtained and wherein the ventilation modes define different indoor temperature set points.

19. A system for controlling ventilation according to claim 18, configured so that in each ventilation mode a value of each control parameter, whether fixed or adjustable, of that ventilation mode can be stored so that when switching from a first ventilation mode to a different, second ventilation mode and back to the first ventilation mode again, the control parameters of the first ventilation mode are restored, preferably the parameters can be stored on and restored from an electronic storage device such as a hard disk drive or a solid state drive.

20. A system for controlling ventilation according to claim 19, configured so that at least two control parameters of the first mode can each be set at different parameters in the second mode.

21. A system for controlling ventilation according to claim 18, configured so that switching from one ventilation mode to another can be done by a user activating a single button, icon or the like, whereby at least two control parameters are changed from one mode to the other without the user activating further buttons, icons or the like.

22. A system for controlling ventilation according to claim 18, wherein the control unit is configured to control the ventilation automatically.

23. A system for controlling ventilation according to claim 18, configured so that in at least two of the ventilation modes both mechanical and natural ventilation can be activated dependent on the value from the sensor.

24. A system for controlling ventilation according to claim 18, wherein at least one the set of adjustable control parameters and the set of fixed control parameters comprises at least two control parameters.

* * * * *